(12) United States Patent
Bernardele (10) Patent No.: US 9,580,144 B2
(45) Date of Patent: Feb. 28, 2017

(54) SPROCKET ASSEMBLY FOR A BICYCLE (71) Applicant: Campagnolo S.r.l., Vicenza (IT)

(72) Inventor: Davide Bernardele, Caldogno (VI) Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/757,940

(22) Filed: Dec. 23, 2015

(65) Prior Publication Data
US 2016/0176477 A1 Jun. 23, 2016

(30) Foreign Application Priority Data

Dec. 23, 2014 (IT) .............................. MI2014A2224

(51) Int. Cl.
*B62M 9/12* (2006.01)
*B62M 9/10* (2006.01)

(52) U.S. Cl.
CPC ........ *B62M 9/12* (2013.01); *B62M 9/10* (2013.01)

(58) Field of Classification Search
CPC ........... B62M 9/10; B62M 9/105; B62M 9/12; F16H 55/30
USPC ......................................................... 474/160
See application file for complete search history.

(56) References Cited

U.S. PATENT DOCUMENTS

| | | | | |
|---|---|---|---|---|
| 6,102,821 | A * | 8/2000 | Nakamura | B62M 9/10 474/160 |
| 8,821,330 | B2 * | 9/2014 | Dal Pra' | B62M 9/10 474/160 |
| 2008/0004143 | A1 | 1/2008 | Kanehisa et al. | |
| 2009/0042681 | A1 | 2/2009 | Dal Prà | |
| 2012/0119565 | A1 * | 5/2012 | Kamada | B62M 9/125 301/110.5 |

FOREIGN PATENT DOCUMENTS

| | | |
|---|---|---|
| EP | 1439117 A2 | 7/2004 |
| EP | 2495161 A1 | 9/2012 |

OTHER PUBLICATIONS

Italian Search Report and Written Opinion in Italian Application No. IT MI2014A002224, with English translation.

* cited by examiner

*Primary Examiner* — William E Dondero
*Assistant Examiner* — Robert T Reese
(74) *Attorney, Agent, or Firm* — Volpe and Koenig, P.C.

(57) ABSTRACT

A bicycle sprocket assembly having a first sprocket of larger diameter and a last sprocket of smaller diameter. The last sprocket has a plurality of throats, arranged between two consecutive teeth, with respective bottom surfaces substantially tangent to a first circumferential diameter. The sprocket assembly includes a plurality of spacers arranged between the first and last sprockets with at least one spacer arranged between the last sprocket and a second-last sprocket. The last spacer comprises a radially outer surface having a second diameter greater than the first diameter and including a plurality of recessed areas, each recessed area is positioned at a respective throat of the plurality of throats. The recessed areas comprise respective base surfaces substantially tangent to a second circumference having a third diameter smaller than or equal to the first diameter.

20 Claims, 13 Drawing Sheets

SPROCKET ASSEMBLY FOR A BICYCLE

CROSS REFERENCE TO RELATED APPLICATION

This application claims the benefit of Italian Application No. MI2014A002224, which was filed on Dec. 23, 2014 and is incorporated herein by reference as if fully set forth.

FIELD OF INVENTION

The present invention relates to a sprocket assembly for a bicycle, in particular, the invention relates to a sprocket assembly for a racing bicycle.

BACKGROUND

As known, the bicycle is a mechanical device moved by muscle power, hence one of the main requirements to be satisfied in the field of bicycles, particularly racing bicycles, is to allow the best possible exploitation of such a muscle power.

In particular, in the field of racing bicycles it is attempted to meet this requirement by increasing the number of gear ratios.

A conventional motion transmission system comprises, in the rear part of the bicycle, a hub associated with the rear wheel of the bicycle and provided with a body, in the jargon known as "freewheel body," capable of rotating idly with respect to the hub in one direction of rotation and of pushing the hub into rotation in the opposite direction.

The freewheel body is in general a cylindrical body having, on the radially outer surface thereof, a plurality of longitudinal grooves configured to engage the sprockets of a sprocket assembly.

The sprockets in turn are engaged with, and pushed in rotation by, a chain which receives the movement from at least one toothed front sprocket associated with one of the two crank arms coupled with the shaft of the bottom bracket assembly of the bicycle, and driven by a rider.

The sprockets are generally made of an extremely strong material (like steel or titanium) to withstand the wearing generated by the sliding of the chain and the loads which they are subjected to during operation. The sprockets can comprise a radially inner surface provided with grooves configured to engage the grooves of the freewheel body. Alternatively, the sprockets can be supported by support elements, often made from light material (like aluminium), having a radially inner surface provided with grooves configured to engage the grooves of the freewheel body. A support element can also support more than one sprocket.

The sprockets of the sprocket assembly are spaced apart through suitable spacers. In general, each spacer is arranged between two adjacent sprockets or between two adjacent support elements, if provided. In the case in which the support elements support two sprockets arranged on opposite sides, they also act as spacers.

The spacers can comprise a radially inner surface provided with groves configured to engage the grooves of the freewheel body.

In the field of racing bicycles, sprocket assemblies are known having nine, ten, or even eleven sprockets.

The sprocket having the smallest diameter of the sprocket assembly has a radially outer toothing (configured to engage the chain) with, typically, eleven or twelve teeth.

The Applicant has felt the need to add, to a sprocket assembly of the type described above, an additional sprocket having a smaller number of teeth with respect to the number of teeth of the sprocket having the smallest diameter of the sprocket assembly, so as to provide the cyclist with a further gear ratio characterised by being extremely long, thus very suitable for flat terrain, downhill and also for sprint finishes in cycling competitions.

Hereinafter, the aforementioned additional sprocket is also indicated as "last sprocket", whereas the aforementioned sprocket having a smaller diameter is also indicated as "second-last sprocket".

The Applicant has observed that the provision of an additional sprocket in a sprocket assembly requires the provision of an additional spacer arranged between such a sprocket and the sprocket having a larger diameter which is immediately adjacent thereto, such a spacer being configured to be fitted onto a free end portion of the freewheel body.

Hereinafter, the aforementioned additional spacer is also indicated as "last spacer".

The Applicant has observed that, in order to ensure that the additional spacer has a sufficient structural strength, since the inner diameter of the additional spacer is imposed by the outer radial size of the freewheel body, the additional spacer should have an outer diameter that in certain cases can be greater than the diameter defined in the additional sprocket at the bottom of the throats of the toothing.

The Applicant has, however, observed that in this case it would not be possible to achieve a correct meshing of the chain on the teeth of the additional sprocket.

SUMMARY

The present invention overcomes the problems outlined above with a sprocket assembly comprising a plurality of sprockets of decreasing diameter configured to be mounted on a freewheel body of a bicycle hub. The plurality of sprockets including a first sprocket of larger diameter and a last sprocket of smaller diameter, wherein the last sprocket comprises a plurality of teeth and a plurality of throats, each throat is arranged between two consecutive teeth, each throat comprising a respective bottom surface substantially tangent to a first circumference having a first diameter. A plurality of spacers are arranged between the first sprocket and the last sprocket; the plurality of spacers including a last spacer arranged between the last sprocket and a second-last sprocket of said plurality of sprockets and having a radially inner surface configured to be fitted onto a free end portion of the freewheel body.

The last spacer of the plurality of spacers comprises a radially outer surface having a second diameter greater than the first diameter and including a plurality of recessed areas positioned at a respective throat of said plurality of throats. The recessed areas comprise respective base surfaces substantially tangent to a second circumference having a third diameter smaller than or equal to the first diameter.

Advantageously, the provision of the aforementioned recessed areas on the radially outer surface of the additional spacer (last spacer) allows the correct meshing of the chain on the teeth of the additional sprocket (last sprocket) in the case in which the outer radial size of the additional spacer (last spacer) is greater than that of the bottom surfaces of the throats of the teeth of the additional sprocket (last sprocket).

BRIEF DESCRIPTION OF THE DRAWING(S)

The features and advantages of the present invention will become clearer from the following detailed description of some preferred embodiments thereof, made with reference to the attached drawings, given for indicating and not limiting purposes. In such drawings.

DETAILED DESCRIPTION OF THE PREFERRED EMBODIMENT(S)

The sprocket assembly of the present invention can comprise one or more of the following preferred features, taken individually or in combination.

Preferably, the last sprocket (additional sprocket) has ten teeth and the second-last sprocket has eleven or twelve teeth.

Preferably, the last sprocket (additional sprocket) is configured to be mounted cantilevered with respect to said freewheel body.

The Applicant has indeed observed that, since the height of the teeth of the last sprocket (additional sprocket) is imposed by the fact that it has to be equal to the height of the teeth of the other sprockets of the sprocket assembly, the cantilevered mounting of the last sprocket (additional sprocket) with respect to the freewheel body makes it possible to use the sprocket assembly provided with the aforementioned last sprocket (additional sprocket) with freewheel bodies having conventional shape and size, without the need to carry out any mechanical processing on such freewheel bodies.

Preferably, the freewheel body has a radially outer surface comprising a plurality of longitudinal grooves defining a plurality of projections and a plurality of recesses, each recess being arranged between two consecutive projections, wherein said projections comprise respective head surfaces that belong to a third circumference having a fourth diameter greater than said first diameter.

Preferably, the last spacer (additional spacer) is made in a single piece with the last sprocket (additional sprocket) and the second-last sprocket.

More preferably, the last sprocket (additional sprocket), the last spacer (additional spacer) and the second-last sprocket are made in a single piece with a third-last sprocket of said plurality of sprockets.

Alternatively, the last sprocket (additional sprocket), the last spacer (additional spacer) and the second-last sprocket can be made in distinct pieces and can be coupled together so as to form a preassembled module configured to later be coupled with the freewheel body.

Preferably, the sprocket assembly of the invention comprises a second-last spacer arranged between the second-last sprocket and the third-last sprocket, said second-last spacer comprising a radially outer surface having a fifth diameter greater than said second diameter.

More preferably, the radially inner surface of the last spacer (additional spacer) is a cylindrical surface with a circular section.

Preferably, the second-last sprocket comprises a radially inner surface having a shape matching the radially outer surface of said freewheel body. In particular, such a radially inner surface comprises longitudinal grooves configured to engage the grooves provided on the radially outer surface of the freewheel body.

Figure 1:
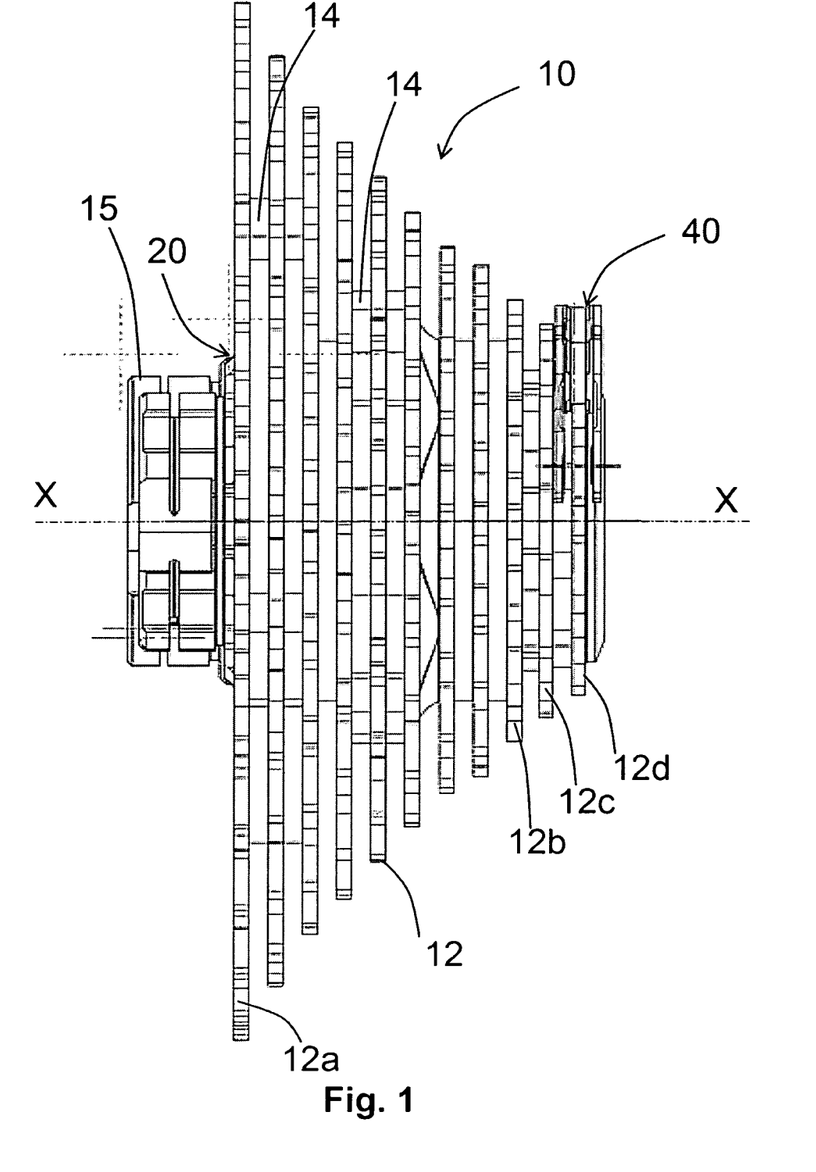
FIG. 1 schematically represents an elevation side view of a bicycle sprocket assembly according to the present invention, with a chain engaged on the last sprocket, the sprocket assembly being mounted on a freewheel body of a bicycle hub.

With initial reference to FIG. 1, there is shown a bicycle sprocket assembly in accordance with the present invention. The sprocket assembly is wholly indicated with 10.

The sprocket assembly 10 is mounted on a freewheel body 20 of a hub for a rear bicycle wheel.

The hub comprises a hub body 15 and a freewheel body 20. The freewheel body 20 is coupled with the hub body 15 through any known system (not shown) through which the freewheel body 20 can rotate idly in one direction of rotation about a rotation axis X-X and push the hub body 15 in the opposite direction of rotation.

FIGS. 3a, 3b and FIGS. 6a, 6b respectively show two different types of freewheel bodies 20 of the conventional type available on the market, which differ in that they have different shapes and sizes.

Hereinafter and in the attached figures the parts and components that are present both in the freewheel body 20 of FIGS. 3a, 3b and in the freewheel body 20 of FIGS. 6a, 6b will be indicated with the same reference numeral.

The freewheel body 20 has a substantially cylindrical shape and has, on the radially outer surface 21 thereof, a plurality of longitudinal grooves 22 configured to be coupled with the sprocket assembly 10 to allow the rotation as a single unit of the sprocket assembly 10 and of the freewheel body 20 about the rotation axis X-X.

The longitudinal grooves 22 define, on the radially outer surface 21 of the freewheel body 20, projections 24 and recesses 26. The projections 24 comprise respective head surfaces 24a that belong to an ideal circumference having its centre on the rotation axis X-X and a diameter D4 for example equal to about 35 mm in the type of freewheel body 20 shown in FIGS. 3a and 3b and equal to about 34.4 mm in the type of freewheel body 20 shown in FIGS. 6a and 6b. The recesses 26 comprise respective base surfaces 26a that belong to an ideal circumference having its centre on the rotation axis X-X and a diameter D6 for example equal to about 29 mm in the type of freewheel body 20 shown in FIGS. 3a and 3b and equal to about 32.1 mm in the type of freewheel body 20 shown in FIGS. 6a and 6b.

With reference to FIG. 1, the sprocket assembly 10 comprises a plurality of sprockets 12 having decreasing diameter (reference numeral 12 is associated with just some of the sprockets shown). Reference numeral 12a indicates the sprocket having the largest diameter and reference numerals 12b, 12c, 12d indicate the three sprockets having smaller diameter of the sprocket assembly 10, wherein sprocket 12c has a smaller diameter than that of sprocket 12b and greater than that of sprocket 12d.

Sprocket 12d is the one which in the introductory part of this description and in the subsequent claims is also indicated as "additional sprocket" or "last sprocket", whereas sprocket 12c is the one which in the introductory part of this description and in the subsequent claims is also indicated as "second-last sprocket" and sprocket 12b is the one which in the introductory part of this description and in the subsequent claims is also indicated as "third-last sprocket".

In the non-limiting example of FIG. 1 the sprocket assembly 10 comprises eleven sprockets in total.

Sprocket 12a is mounted on the freewheel body 20 and abuts against an axial abutment element 28 of the freewheel body 20. Sprockets 12b and 12c, as well as all the other sprockets arranged between sprocket 12a and sprocket 12b, are also mounted on the freewheel body 20. Sprocket 12d, on the other hand, is mounted cantilevered with respect to the freewheel body 20, as shown in FIGS. 4a, 4b and 7a, 7b.

The sprocket assembly 10 further comprises a plurality of spacers 14, each arranged between two consecutive sprockets 12 (reference numeral 14 is associated with just some of the spacers shown). Reference numeral 14a indicates the spacer arranged between sprockets 12b and 12c, whereas reference numeral 14b indicates the spacer arranged between sprockets 12b and 12c.

Spacer 14a is the one which in the introductory part of this description and in the subsequent claims is also indicated as "second-last spacer", whereas spacer 14b is the one which in the introductory part of this description and in the subsequent claims is also indicated as "last spacer".

Spacer 14a is mounted on the freewheel body 20 at the projections 24, whereas spacer 14b is mounted on the freewheel body 20 at a free end portion 23 thereof whose radially outer surface has no grooves 22.

The attached figures show a conventional chain 40 engaged on the sprocket 12d. The chain 40 comprises a succession of links 42, each link consisting of a pair of plates 44 facing one another and spaced apart to define an insertion space for a tooth of the sprocket 12d. The plates 44 of a link 42 are coupled with the plates 44 of the subsequent link 42 through a rivet 46, which in turn is surrounded by a bush 48 capable of rotating freely with respect to the rivet 46.

Figure 2:
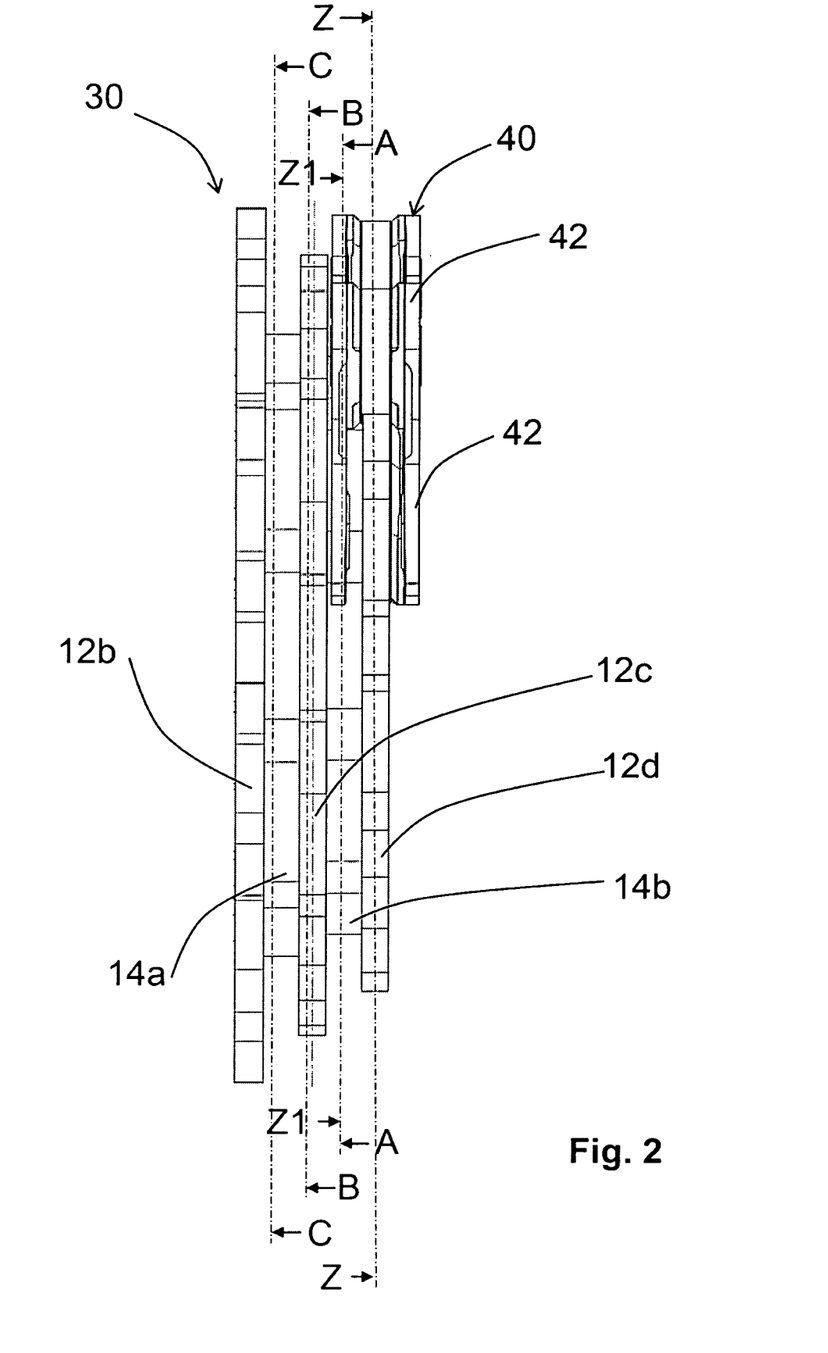
FIG. 2 schematically represents an elevation side view of a part of the sprocket assembly of FIG. 1, in particular of a module formed by the three sprockets of smallest diameter of the aforementioned sprocket assembly.

FIG. 2 shows a part of the sprocket assembly 10. In particular, a sprocket module is shown comprising the three sprockets of smallest diameter 12b, 12c and 12d of the sprocket assembly 10 and the spacers 14a and 14b. Such a module is wholly indicated with 30.

In the non-limiting example shown in the attached figures, the module 30 comprises a sprocket 12d having ten teeth, a sprocket 12c having eleven teeth and a sprocket 12b having twelve teeth.

FIGS. 4a, 4b and FIGS. 7a, 7b, respectively illustrate two different embodiments of the module 30, which differ in that they have different shapes and sizes.

Hereinafter and in the attached figures the parts and components that are present both in the module 30 of FIGS. 4a, 4b and in the module 30 of FIGS. 7a, 7b will be indicated with the same reference numeral.

Sprockets 12b, 12c and 12d and spacers 14a and 14b are made in a single piece.

In alternative embodiments that are not shown, only some of sprockets 12b, 12c and 12d and spacers 14a and 14b are made in a single piece.

In a further alternative embodiment that is not shown, sprockets 12b, 12c and 12d and spacers 14a and 14b are made in distinct pieces and are coupled together so as to form a preassembled module.

Figure 3A:
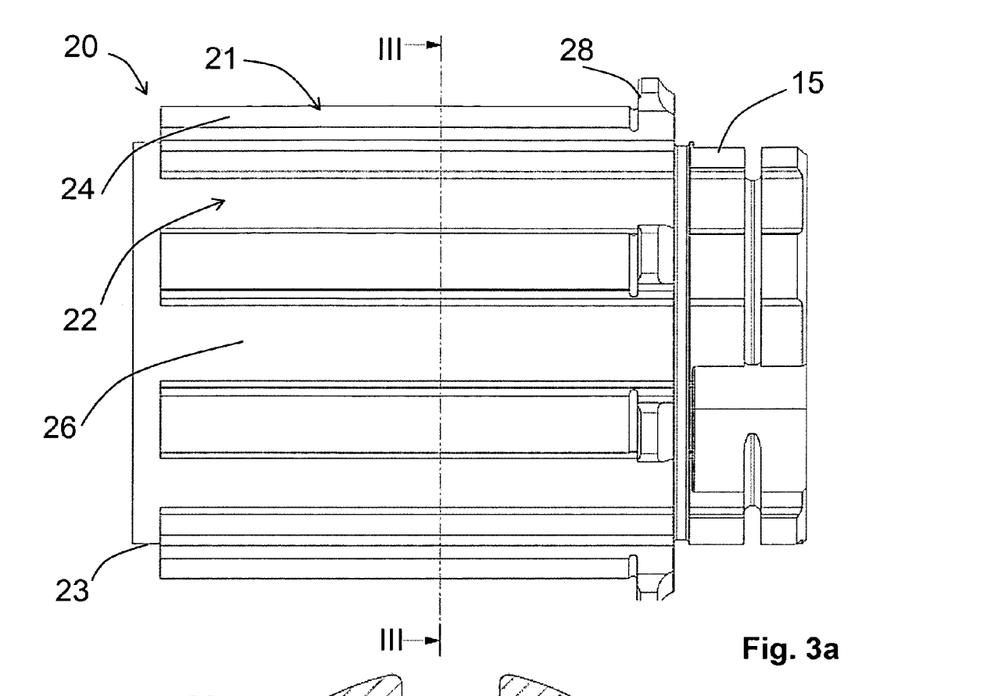
FIGS. 3a and 3b schematically represent, respectively, an elevation side view and a cross section (taken according to the plane line III-III of FIG. 3a) of a first type of the freewheel body of FIG. 1.
Figure 3B:
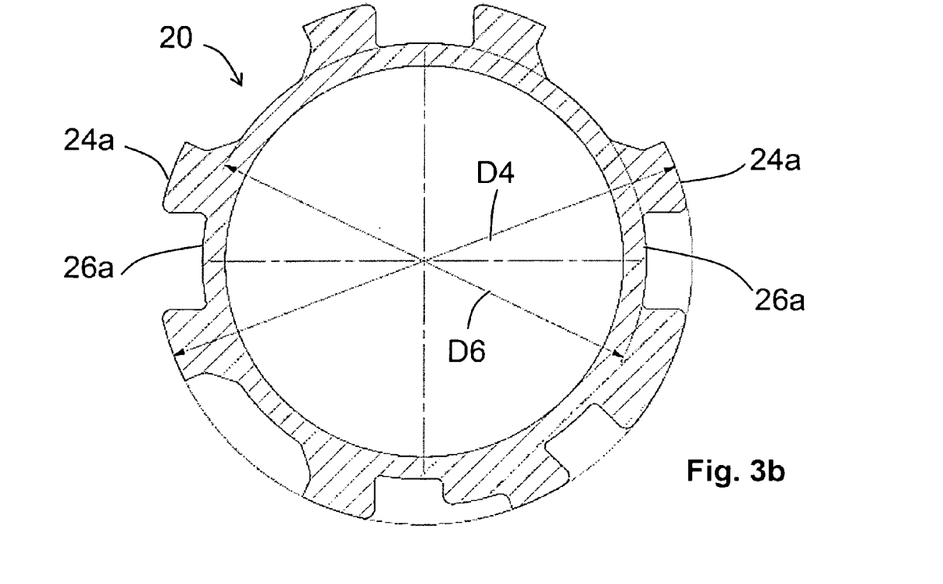
Figure 4A:
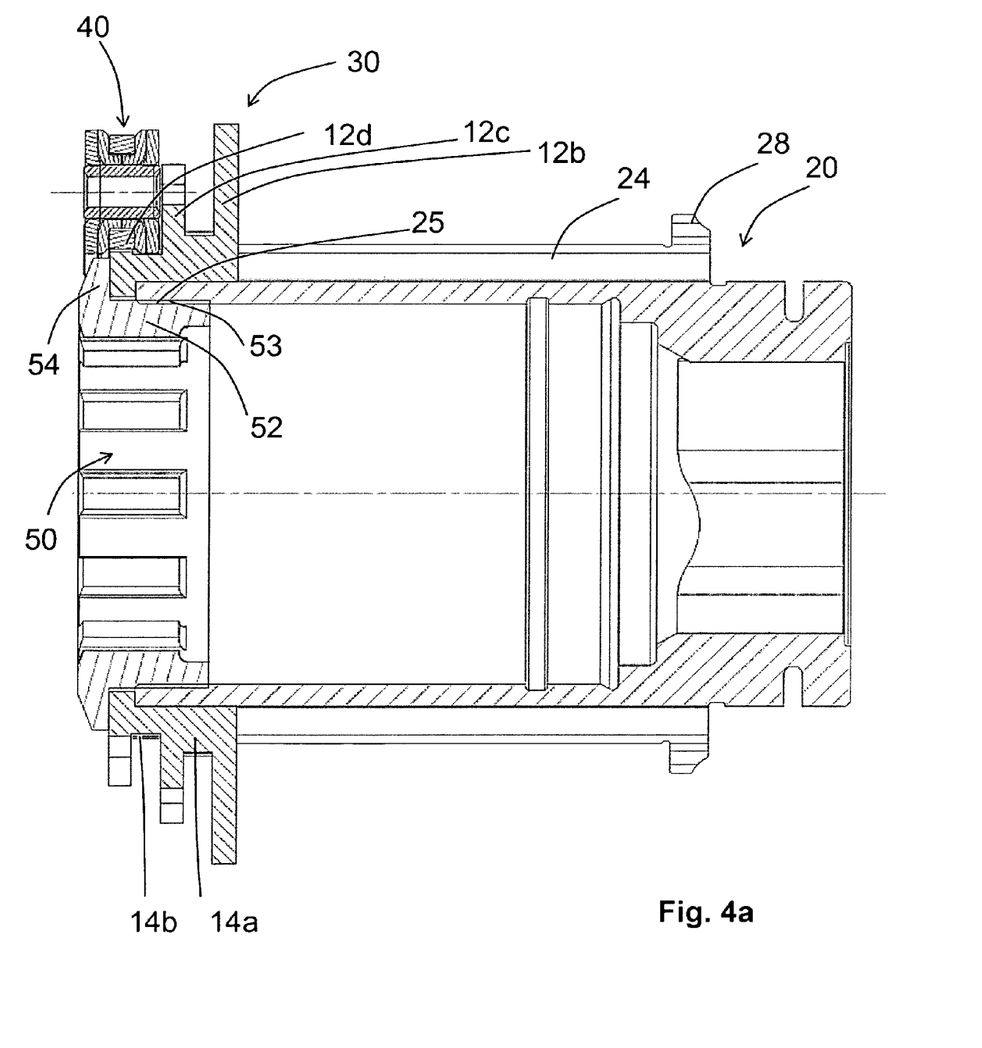
FIGS. 4a and 4b schematically represent respective longitudinal sections of a first embodiment of the module of three sprockets of FIG. 2 mounted on the freewheel body of FIGS. 3a and 3b (in such figures it is also possible to see a locking ring nut of the sprocket assembly on the freewheel body)
Figure 6A:
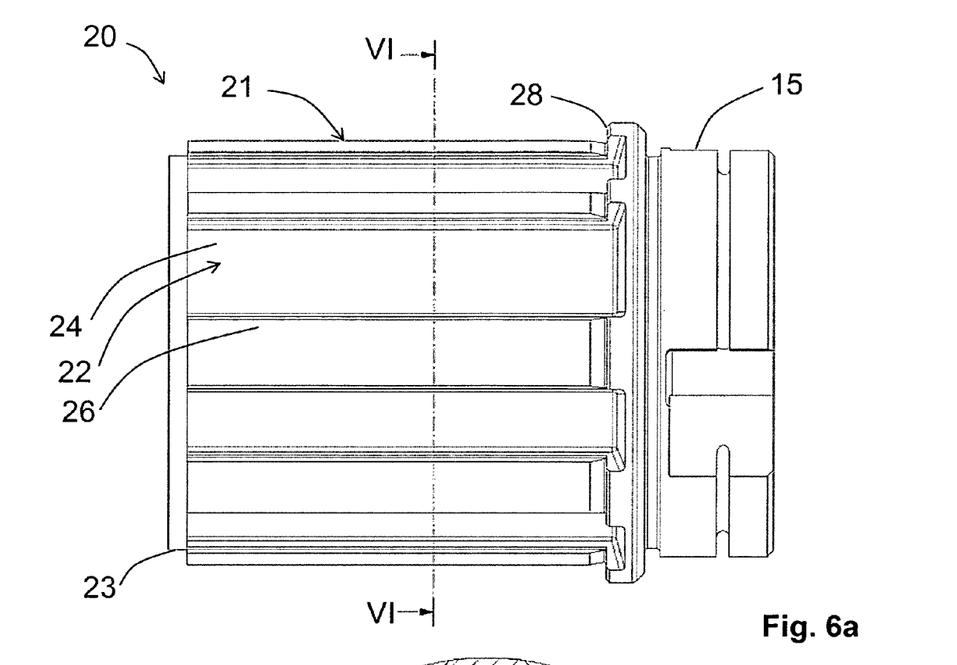
FIGS. 6a and 6b schematically represent, respectively, an elevation side view and a cross section (taken according to the plane line VI-VI of FIG. 6a) of a second type of the freewheel body of FIG. 1.
Figure 6B:
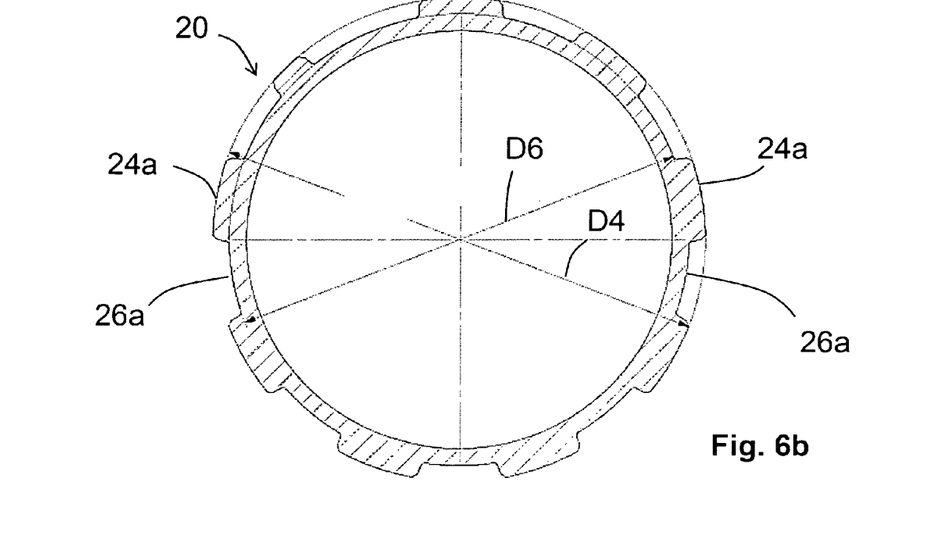
Figure 7A:
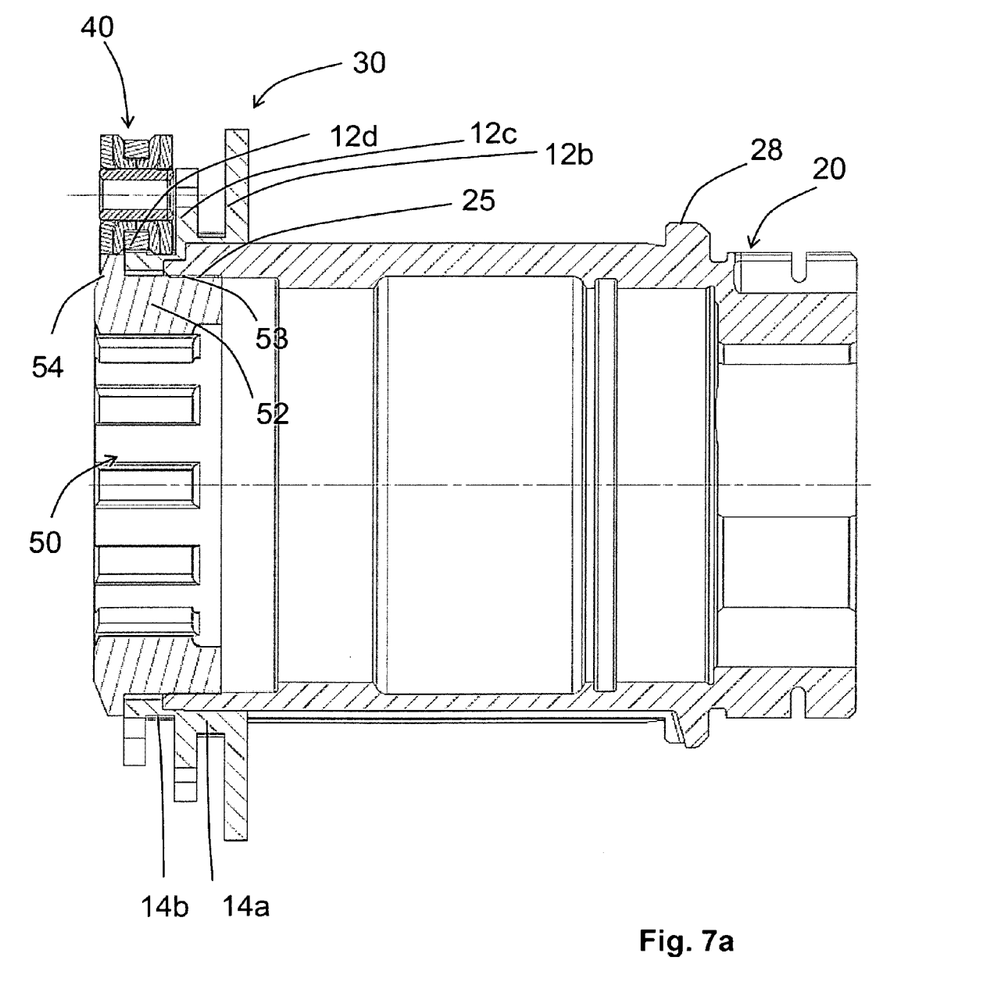
FIGS. 7a and 7b schematically represent respective longitudinal sections of two variants of a further embodiment of the module of three sprockets of FIG. 2, mounted on the freewheel body of FIGS. 6a and 6b (in such figures it is also possible to see a locking ring nut of the sprocket assembly on the freewheel body)

FIG. 4a shows a first embodiment of the sprocket module 30 of FIG. 2 mounted on the freewheel body 20 of FIGS. 3a, 3b, whereas FIG. 7a shows a second embodiment of the sprocket module 30 of FIG. 2 mounted on the freewheel body 20 of FIGS. 6a, 6b.

The sprocket module 30 of FIG. 7a has a larger inner radial dimensions than the sprocket module 30 of FIG. 4a; the outer radial dimensions of sprockets 12b, 12c, 12d and spacers 14a, 14b are equal in both figures, and the number of teeth of each of the sprockets 12b, 12c, 12d is equal in both figures.

In both the embodiments of FIGS. 4a and 7a, a locking ring nut 50 is screwed onto the freewheel body 20. The locking ring nut 50 comprises a substantially cylindrical portion 52 and a substantially annular portion 54 that projects radially outwards with respect to the substantially cylindrical portion 52.

The substantially cylindrical portion 52 is provided with an outer threading 53 that is screwed onto an inner threading 25 of the freewheel body 20. The substantially annular portion 54 abuts axially on the sprocket 12d, locking the sprocket assembly 10 on the freewheel body 20.

Figure 4B:
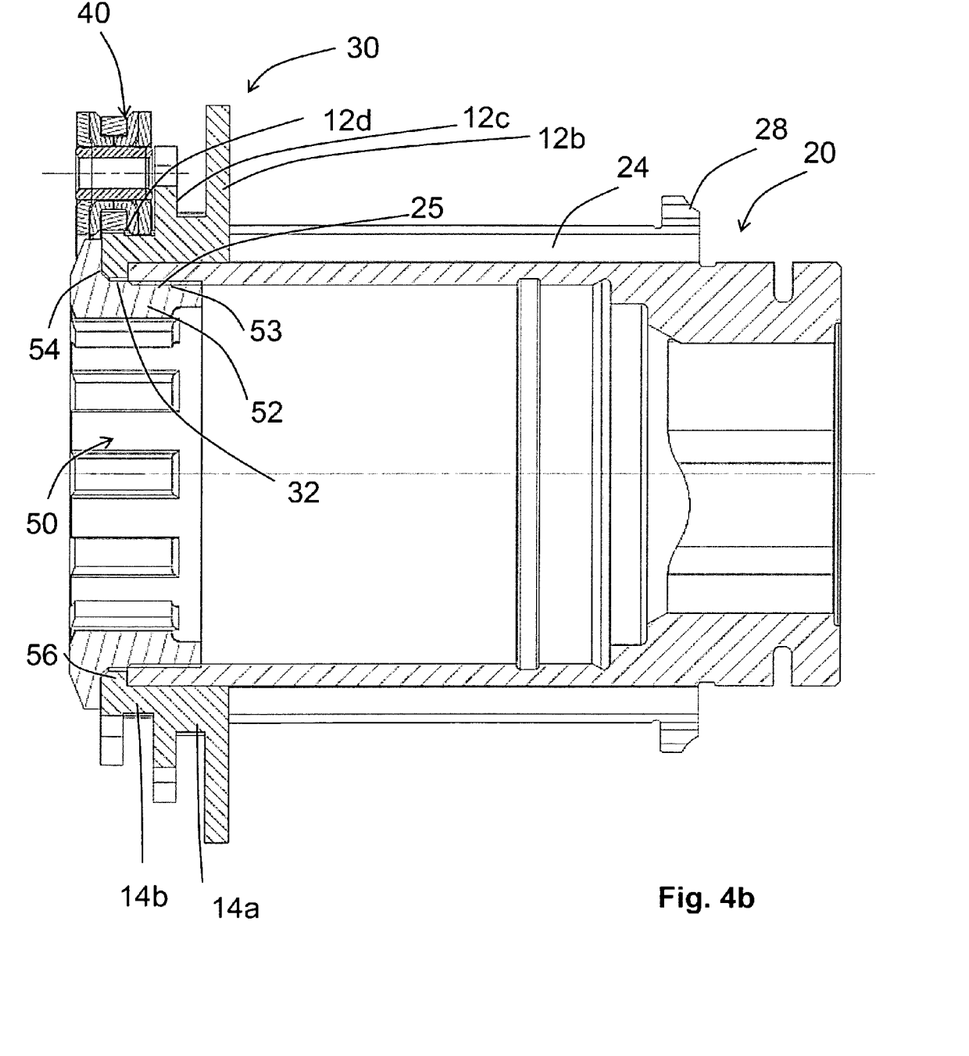
Figure 7B:
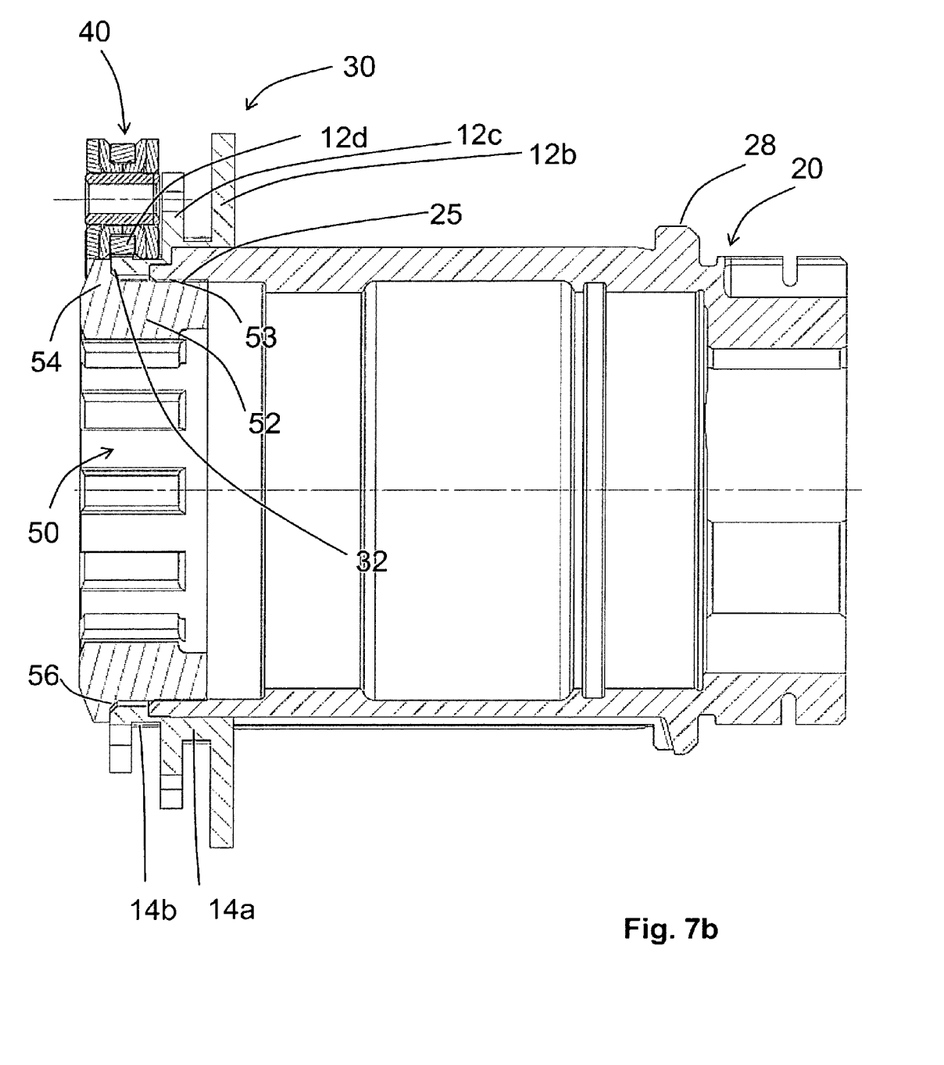

FIGS. 4b and 7b show a variant of the sprocket module 30 and of the locking ring nut 50 respectively of FIGS. 4a and 7a. The sprocket module 30 of FIGS. 4b, 7b differs from that of FIGS. 4a, 7a solely in that a bevel or flaring 32 is provided on a radially inner surface of the sprocket 12d. The locking ring nut 50 of FIGS. 4b, 7b differs from that of FIGS. 4a, 7a solely in that a radiused surface 56 is provided between the substantially cylindrical portion 52 and the substantially annular portion 54. When the locking ring nut 50 of FIGS. 4b and 7b abuts on the sprocket 12d of FIGS. 4b and 7b, the radiused surface 56 is located at the bevel 32.

Figure 2A:
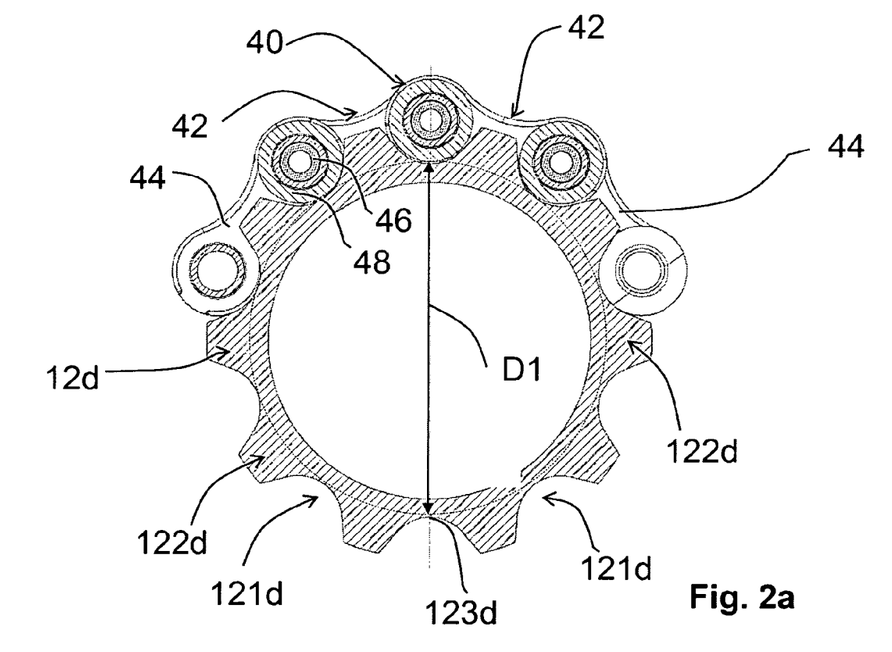
FIG. 2a schematically represents a cross section, taken according to the plane line Z-Z of FIG. 2, of the last sprocket of the sprocket assembly of FIG. 1 and of a portion of the chain engaged thereon.
Figure 2B:
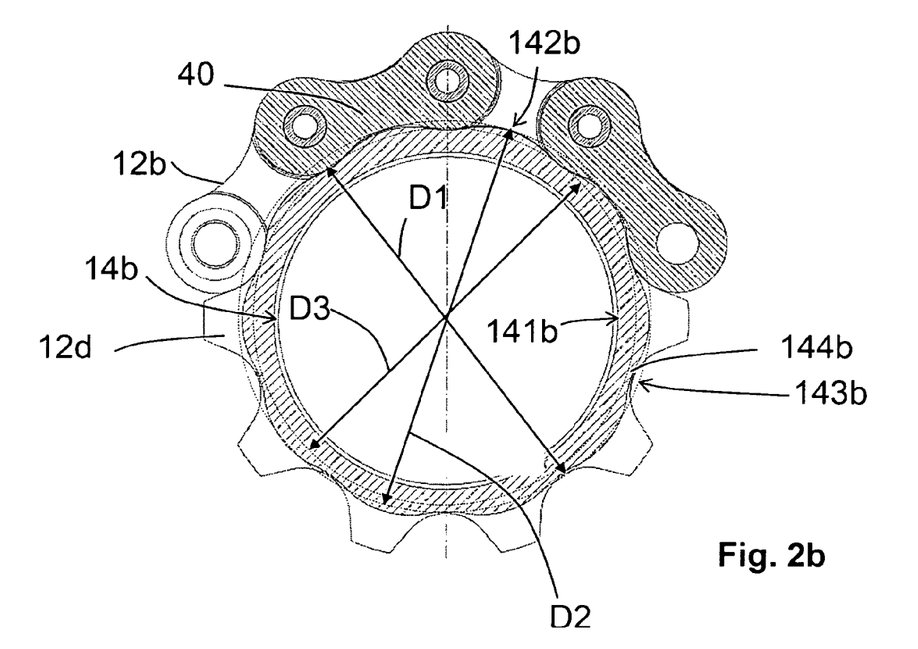
FIG. 2b schematically represents a cross section, taken according to the plane line Z1-Z1 of FIG. 2, of the last spacer of the sprocket assembly of FIG. 1.

As shown in FIG. 2a, the sprocket 12d has a plurality of throats 121d, each arranged between two consecutive teeth 122d. The throats 121d comprise respective bottom surfaces 123d substantially tangent to a circumference having a diameter D1.

Figure 5A:
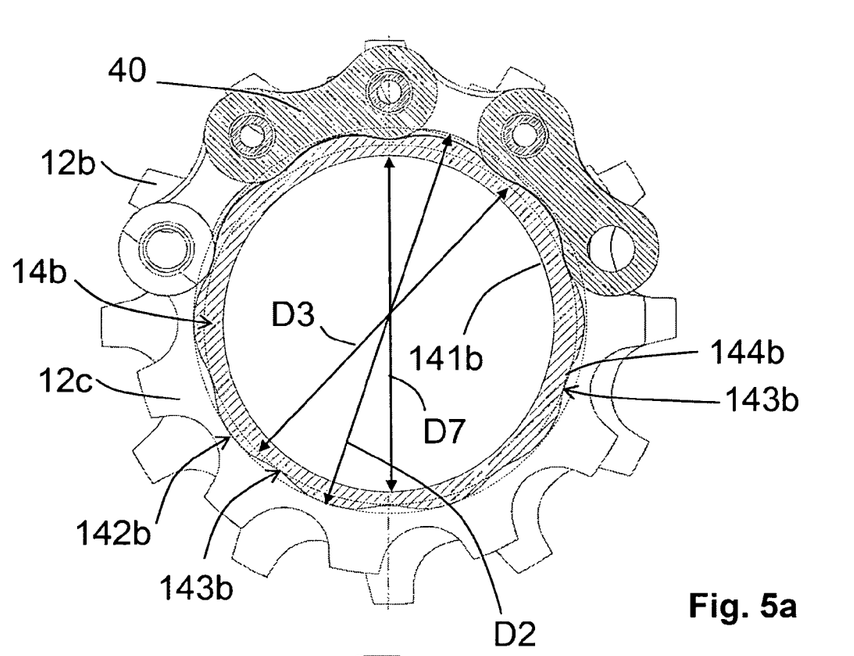
FIGS. 5a, 5b and 5c schematically represent cross sections (respectively taken according to the plane lines A-A, B-B and C-C of FIG. 2) of the module of three sprockets of FIGS. 4a, 4b.
Figure 8A:
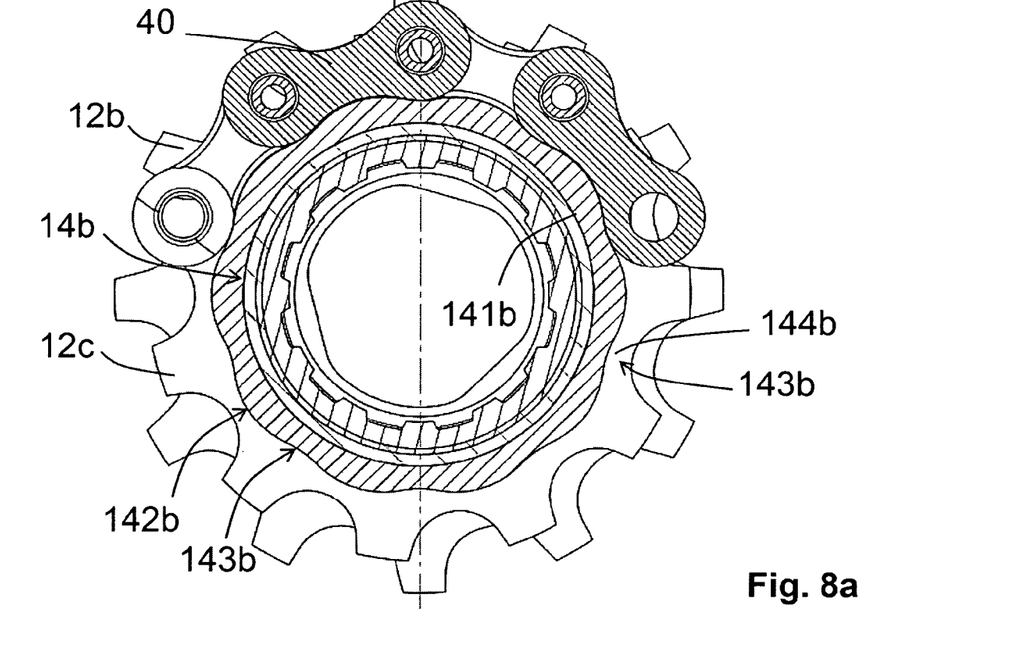
FIGS. 8a, 8b and 8c schematically represent cross sections (respectively taken according to the plane lines A-A, B-B and C-C of FIG. 2) of the module of three sprockets of FIGS. 7a, 7b.

In FIGS. 5a and 8a it is possible to see the spacer 14b arranged between the sprockets 14d and 14c of the two modules 30 respectively of FIGS. 4a, 4b and 7a, 7b. Such a spacer 14b in both cases has a substantially annular shape and a radially inner surface 141b that is associated with a free end portion 23 of the freewheel body 20 of FIGS. 3a, 3b and 6a, 6b. Such a radially inner surface 141b is a cylindrical surface with a circular section having a diameter D7.

The spacer 14b comprises a radially outer surface 142b having a diameter D2 greater than the diameter D1.

The spacer 14b comprises a plurality of recessed areas 143b. Each recessed area 143b is positioned at a respective throat 121d of the sprocket 12d.

The recessed areas 143b provide the radially outer surface 142b of the spacer 14b with a shape that vaguely resembles the profile of a daisy.

The recessed areas 143b comprise respective base surfaces 144b substantially tangent to a circumference having a diameter D3 substantially equal to the diameter D1.

Figure 5B:
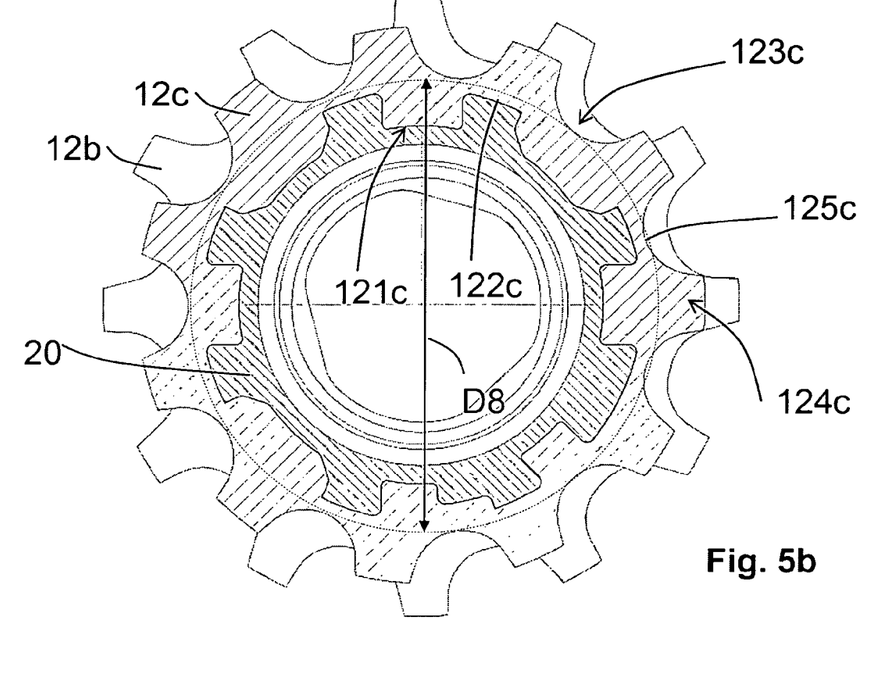
Figure 8B:
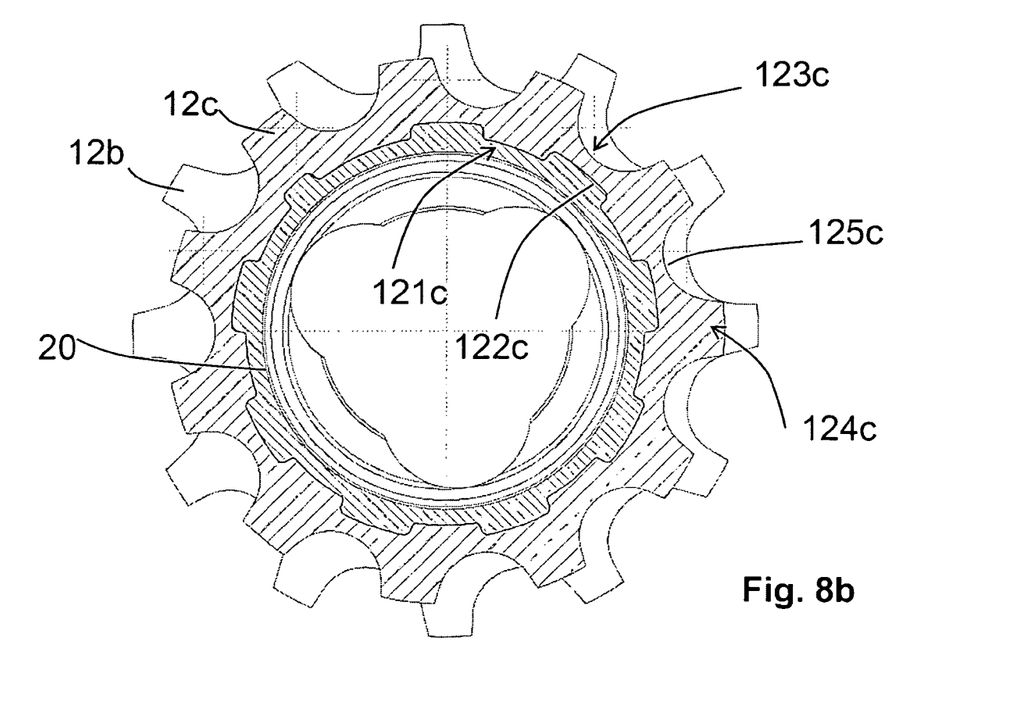

As shown in FIGS. 5b and 8b, the sprocket 12c has a plurality of throats 123c, each arranged between two consecutive teeth 124c. The throats 123c comprise respective bottom surfaces 125c substantially tangent to a circumference having a diameter D8.

The sprocket 12c comprises a radially inner surface 121c having a shape matching the radially outer surface 21 of the freewheel body 20. In particular, the radially inner surface 121c comprises longitudinal grooves 122c configured to engage the grooves 22 provided on the radially outer surface 21 of the freewheel body 20.

Figure 5C:
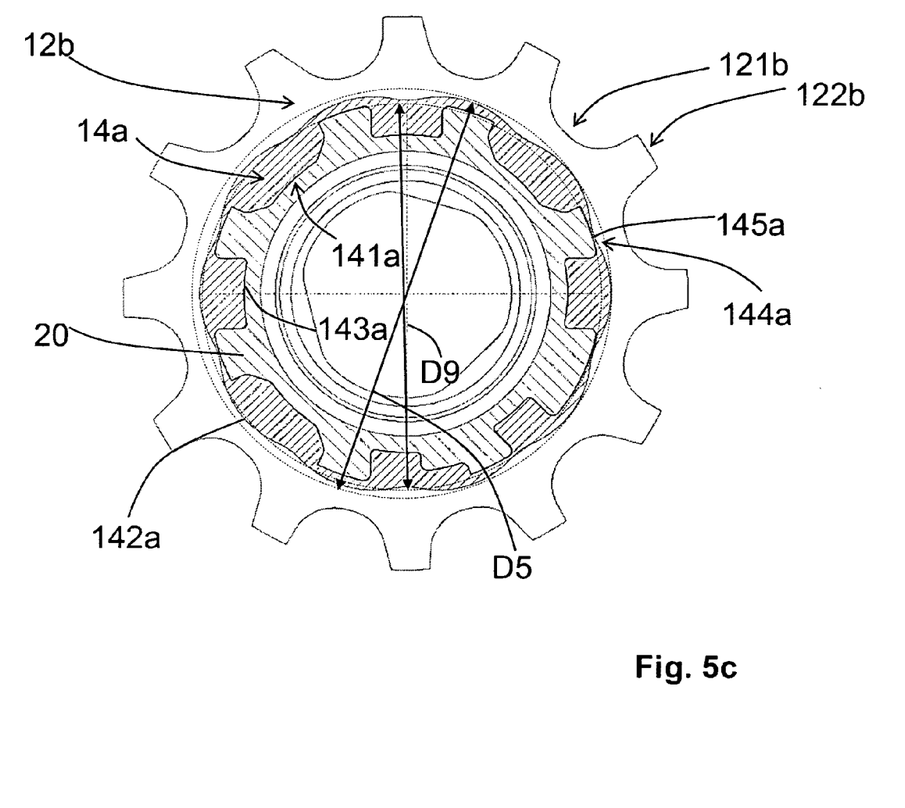
Figure 8C:
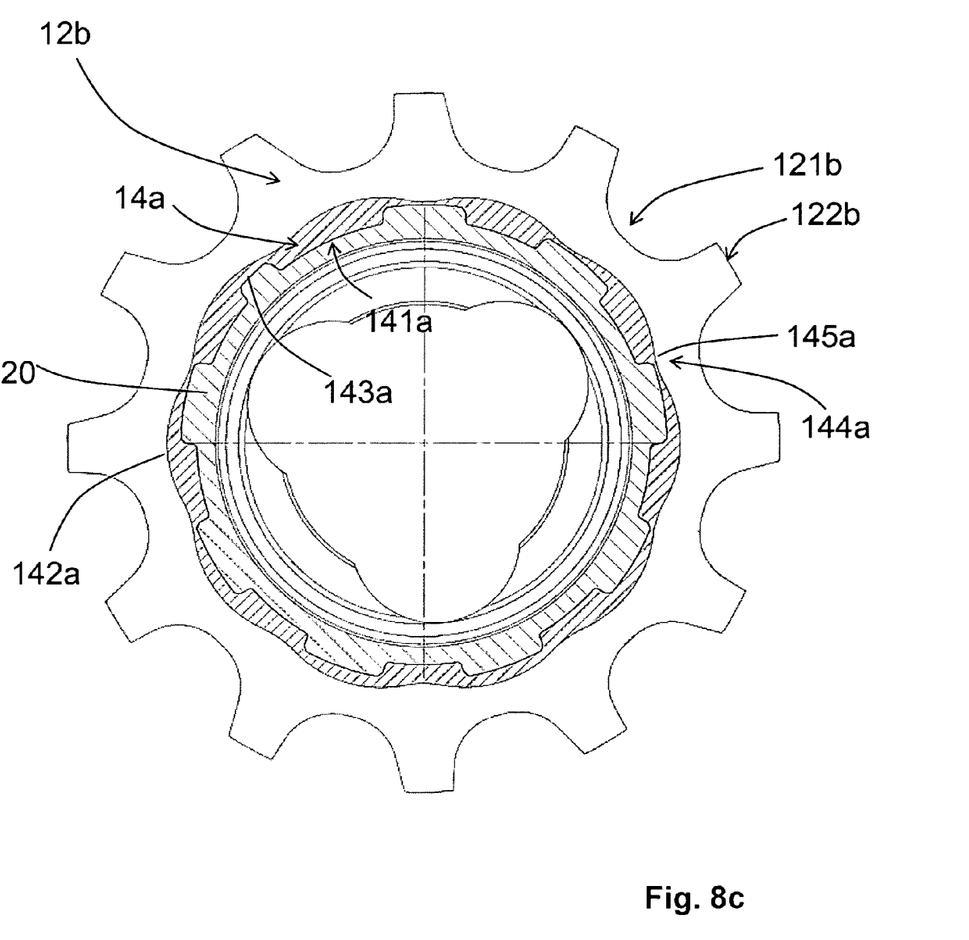

As shown in FIGS. 5c and 8c, the sprocket 12b has a plurality of throats 121b, each arranged between two consecutive teeth 122b.

The sprocket 12b comprises a radially inner surface (not visible in FIGS. 5c, 8c) of a shape matching the radially outer surface 21 of the freewheel body 20, and thus provided with longitudinal grooves configured to engage the grooves 22 provided on the radially outer surface 21 of the freewheel body 20.

Again with reference to FIGS. 5c and 8c, the spacer 14a arranged between the sprocket 12c and the sprocket 12b comprises-a radially outer surface 142a having a radial size greater than that of the radially outer surface 142b of the spacer 14b. In other words, the radially outer surface 142a has a diameter D5 greater than the diameter D2.

The spacer 14a comprises a radially inner surface 141a having a shape matching the radially outer surface 21 of the freewheel body 20. In particular, the radially inner surface 141a comprises longitudinal grooves 143a configured to engage the grooves 22 provided on the radially outer surface 21 of the freewheel body 20.

The spacer 14a comprises a plurality of recessed areas 144a. Each recessed area 144a is positioned at a respective throat 123c of the sprocket 12c.

The recessed areas 144a also in this case provide the radially outer surface del spacer 14a with a shape that vaguely resembles the profile of a daisy.

The recessed areas 144a comprise respective base surfaces 145a substantially tangent to a circumference having a diameter D9 substantially equal to the diameter D8.

In an alternative embodiment that is not shown, the spacer 14a has a radially outer surface without recessed areas. In this case, the outer radial size of the spacer 14a is smaller than or equal to the diameter D8.

In a further alternative embodiment that is not shown, the spacer 14a is defined by a plurality of spacer elements made in one piece with, and axially projecting cantilevered from, at least one of the sprockets 12b and 12c (preferably, made in one piece with both the sprockets 12b, 12c), such spacer elements being arranged at the projections of the longitudinal grooves 122c of the radially inner surface 121c of the sprocket 12c (in the case in which the spacer elements are made in one piece with the sprocket 12c) or at the projections of the longitudinal grooves of the radially inner surface of the sprocket 12b (in the case in which the spacer elements are made in one piece with the sprocket 12b).

Of course, those skilled in the art can bring numerous modifications and variants to the invention described above, in order to satisfy specific and contingent requirements, all of which are in any case within the scope of protection of the present invention as defined by the following claims.

What is claimed is:

1. A bicycle sprocket assembly, comprising:
a plurality of sprockets of decreasing diameter configured to be mounted on a freewheel body of a bicycle hub, said plurality of sprockets including a first sprocket of larger diameter and a last sprocket of smaller diameter, wherein said last sprocket comprises a plurality of teeth and a plurality of throats, each throat being arranged between two consecutive teeth, said throats comprising respective bottom surfaces substantially tangent to a first circumference having a first diameter; and,
a plurality of spacers arranged between said first sprocket and said last sprocket, said plurality of spacers including a last spacer arranged between said last sprocket and a second-last sprocket of said plurality of sprockets and having a radially inner surface configured to be fitted onto a free end portion of said freewheel body;
wherein said last spacer comprises a radially outer surface having a second diameter greater than said first diameter and including a plurality of recessed areas, each recessed area being positioned at a respective throat of said plurality of throats, wherein said recessed areas comprise respective base surfaces substantially tangent to a second circumference having a third diameter smaller than or equal to said first diameter.

2. The sprocket assembly according to claim 1, wherein said last sprocket has ten teeth and said second-last sprocket has eleven or twelve teeth.

3. The sprocket assembly according to claim 2, wherein said last sprocket is configured to be mounted cantilevered with respect to said freewheel body.

4. The sprocket assembly according to claim 3, wherein said freewheel body has a radially outer surface comprising a plurality of longitudinal grooves defining a plurality of projections and a plurality of recesses, each recess being arranged between two consecutive projections, wherein said projections comprise respective head surfaces that belong to a third circumference having a fourth diameter greater than said first diameter.

5. The sprocket assembly according to claim 4, wherein said last spacer is a single piece with said last sprocket and said second-last sprocket.

6. The sprocket assembly according to claim 5, wherein said last sprocket, said last spacer and said second-last sprocket are a single piece with a third-last sprocket of said plurality of sprockets.

7. The sprocket assembly according to claim 6, wherein said last spacer in a single piece with said last sprocket and said second-last sprocket.

8. The sprocket assembly according to claim 7, wherein said last sprocket, said last spacer and said second-last sprocket are a single piece with a third-last sprocket of said plurality of sprockets.

9. The sprocket assembly according to claim 2, wherein said freewheel body has a radially outer surface comprising a plurality of longitudinal grooves defining a plurality of projections and a plurality of recesses, each recess being arranged between two consecutive projections, wherein said projections comprise respective head surfaces that belong to a third circumference having a fourth diameter greater than said first diameter.

10. The sprocket assembly according to claim 9, wherein said last spacer is a single piece with said last sprocket and said second-last sprocket.

11. The sprocket assembly according to claim 10, wherein said last sprocket, said last spacer and said second-last sprocket are a single piece with a third-last sprocket of said plurality of sprockets.

12. The sprocket assembly according to claim 1, wherein said last sprocket is configured to be mounted cantilevered with respect to said freewheel body.

13. The sprocket assembly according to claim 12, wherein said freewheel body has a radially outer surface comprising a plurality of longitudinal grooves defining a plurality of projections and a plurality of recesses, each recess being arranged between two consecutive projections, wherein said projections comprise respective head surfaces that belong to a third circumference having a fourth diameter greater than said first diameter.

14. The sprocket assembly according to claim 1, wherein said freewheel body has a radially outer surface comprising a plurality of longitudinal grooves defining a plurality of projections and a plurality of recesses, each recess being arranged between two consecutive projections, wherein said projections comprise respective head surfaces that belong to a third circumference having a fourth diameter greater than said first diameter.

15. The sprocket assembly according to claim 1, wherein said last spacer is a single piece with said last sprocket and said second-last sprocket.

16. The sprocket assembly according to claim 15, wherein said last sprocket, said last spacer and said second-last sprocket are a single piece with a third-last sprocket of said plurality of sprockets.

17. The sprocket assembly according to claim 16, comprising a second-last spacer arranged between said second-last sprocket and said third-last sprocket, wherein said second-last spacer comprises a radially outer surface having a fifth diameter greater than said second diameter.

18. The sprocket assembly according to claim 1, wherein said radially inner surface is a cylindrical surface with a circular section.

19. The sprocket assembly according to claim 1, wherein said second-last sprocket comprises a radially inner surface having a shape matching the radially outer surface of said freewheel body.

20. A bicycle sprocket assembly, comprising:
a plurality of sprockets mounted on a freewheel body of a bicycle hub, said plurality of sprockets including a first sprocket of a largest diameter and a last sprocket of a smallest diameter, wherein said last sprocket comprises a plurality of teeth and a plurality of throats, each throat being arranged between two consecutive teeth, said throats comprising respective bottom surfaces substantially tangent to a first circumference having a first diameter; and,
a plurality of spacers arranged between said first sprocket and said last sprocket, said plurality of spacers including a last spacer arranged between said last sprocket and a second-last sprocket of said plurality of sprockets and having a radially inner surface configured to be fitted onto a free end portion of said freewheel body; and, said last spacer comprises a radially outer surface having a second diameter greater than said first diameter and including a plurality of recessed areas, each recessed area being positioned at a respective throat of said plurality of throats, wherein said recessed areas comprise respective base surfaces substantially tangent to a second circumference having a third diameter smaller than or equal to said first diameter.

* * * * *